(12) United States Patent
Wang et al.

(10) Patent No.: US 12,598,039 B2
(45) Date of Patent: Apr. 7, 2026

(54) METHOD AND DEVICE FOR WIRELESS COMMUNICATION, ELECTRONIC DEVICE AND STORAGE MEDIUM

(71) Applicants: Beijing ESWIN Computing Technology Co., Ltd., Beijing (CN); Guangzhou Transa Semi Information Technology Co., Ltd., Guangzhou (CN)

(72) Inventors: Baohui Wang, Beijing (CN); Xinghua Li, Beijing (CN); Jie Hou, Beijing (CN); Qi Yang, Beijing (CN)

(73) Assignees: Beijing ESWIN Computing Technology Co., Ltd., Beijing (CN); Guangzhou Transa Semi Information Technology Co., Ltd., Guangzhou (CN)

( * ) Notice: Subject to any disclaimer, the term of this patent is extended or adjusted under 35 U.S.C. 154(b) by 453 days.

(21) Appl. No.: 18/108,447

(22) Filed: Feb. 10, 2023

(65) Prior Publication Data

US 2024/0106591 A1    Mar. 28, 2024

(30) Foreign Application Priority Data

Sep. 23, 2022    (CN) .......................... 202211168126.0

(51) Int. Cl.
H04L 5/00        (2006.01)
H04W 28/18      (2009.01)

(52) U.S. Cl.
CPC ........... H04L 5/0048 (2013.01); H04W 28/18 (2013.01)

(58) Field of Classification Search
CPC ... H04L 5/0048; H04L 1/0004; H04L 1/0005; H04W 28/18; H04W 28/22; H04W 84/12; H04W 52/0245; H04W 80/10
See application file for complete search history.

(56) References Cited

U.S. PATENT DOCUMENTS

| | | | | | |
|---|---|---|---|---|---|
| 10,104,620 | B2 * | 10/2018 | Park | .................. | H04W 52/0245 |
| 2013/0336182 | A1 * | 12/2013 | Asterjadhi | ............ | H04L 69/324 |
| | | | | | 370/310 |

(Continued)

FOREIGN PATENT DOCUMENTS

| | | | | | |
|---|---|---|---|---|---|
| CN | | 114698063 | A * | 7/2022 | ............ H04W 88/04 |
| WO | WO-2016099137 | A1 * | 6/2016 | ............ H04W 74/08 |

(Continued)

OTHER PUBLICATIONS

First Search Report for Chinese Patent Application No. 2022111681260, Jun. 4, 2025, 2 pages. [Not in English].

*Primary Examiner* — Ayaz R Sheikh
*Assistant Examiner* — Louis Samara
(74) *Attorney, Agent, or Firm* — WOMBLE BOND DICKINSON (US) LLP

(57) ABSTRACT

A method for wireless communication is provided, relating to field of wireless communication and including: determining, by an access point device, a first beacon frame and a first modulation mode; and transmitting, by the access point device, the first beacon frame to a station device according to the first modulation mode; where the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode; a length of the target beacon frame is shorter than a length of the original beacon frame, and a transmission rate corresponding to the target modulation mode is greater than a transmission rate corresponding to the original modulation mode.

18 Claims, 2 Drawing Sheets

Determining, by an access point device, a first beacon frame and a first modulation mode, where the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode; a length of the target beacon frame is shorter than a length of the original beacon frame, and a transmission rate corresponding to the target modulation mode is greater than a transmission rate corresponding to the original modulation mode
101

Transmitting, by the access point device, the first beacon frame to a station device according to the first modulation mode
102

(56) References Cited

U.S. PATENT DOCUMENTS

| | | | | |
|---|---|---|---|---|
| 2016/0248564 | A1 | 8/2016 | Qi | |
| 2018/0184435 | A1* | 6/2018 | Cariou .............. | H04W 36/0061 |
| 2018/0279209 | A1 | 9/2018 | Fang | |
| 2019/0238259 | A1* | 8/2019 | Huang ................. | H04L 1/0005 |
| 2019/0253972 | A1* | 8/2019 | Park ................. | H04W 52/0235 |
| 2022/0353821 | A1* | 11/2022 | Wang ............... | H04W 52/0235 |
| 2022/0408349 | A1* | 12/2022 | Kneckt ................ | H04W 76/15 |

FOREIGN PATENT DOCUMENTS

| | | | | | |
|---|---|---|---|---|---|
| WO | WO-2018056679 | A1 * | 3/2018 | ........... | H04W 84/12 |
| WO | WO-2019045438 | A1 * | 3/2019 | ........... | H04W 80/10 |

* cited by examiner

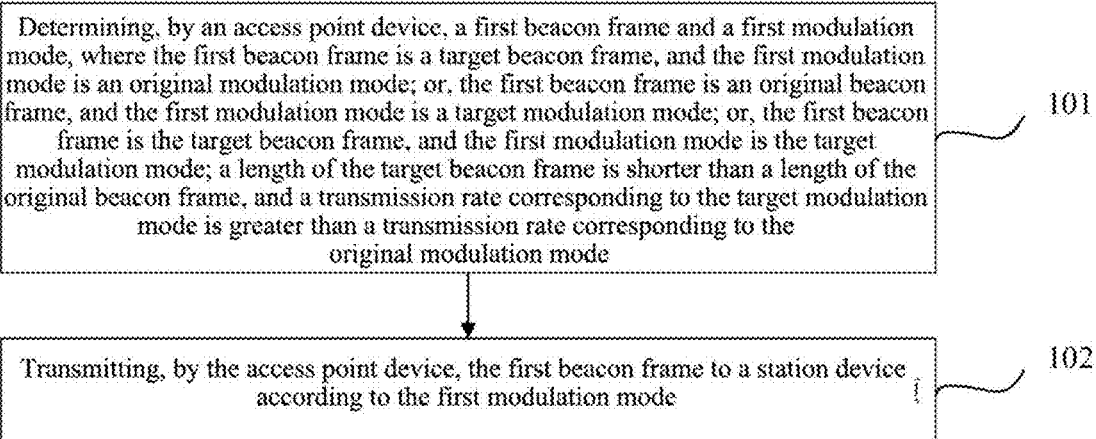

Determining, by an access point device, a first beacon frame and a first modulation mode, where the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode; a length of the target beacon frame is shorter than a length of the original beacon frame, and a transmission rate corresponding to the target modulation mode is greater than a transmission rate corresponding to the original modulation mode                101

Transmitting, by the access point device, the first beacon frame to a station device according to the first modulation mode                102

FIG. 1

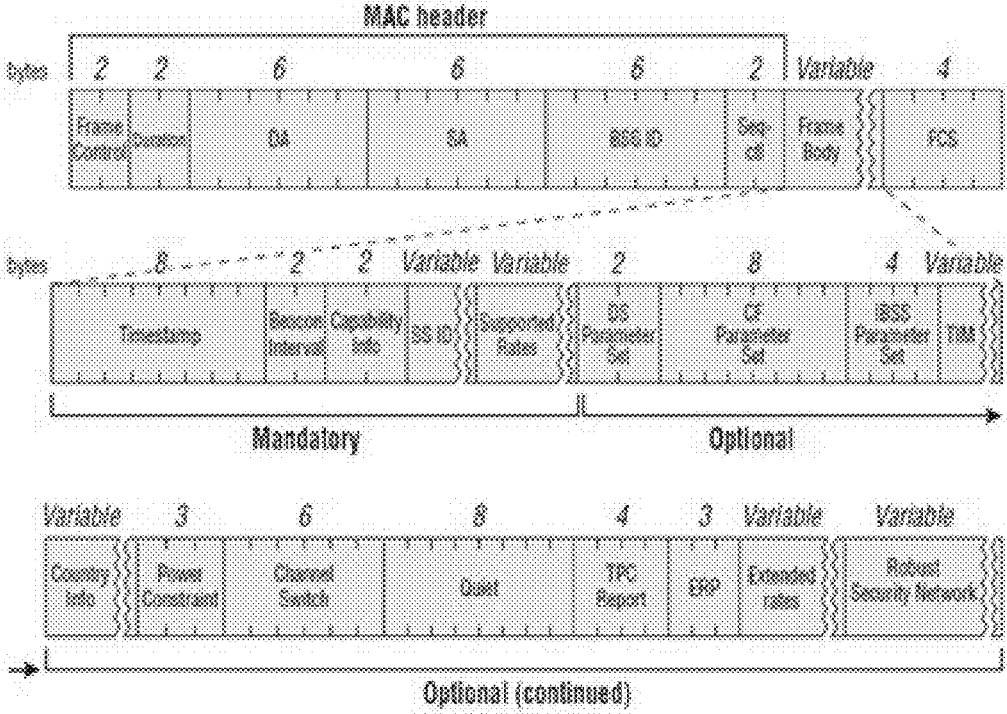

FIG. 2

METHOD AND DEVICE FOR WIRELESS COMMUNICATION, ELECTRONIC DEVICE AND STORAGE MEDIUM

CROSS-REFERENCE TO RELATED APPLICATION

The present application claims priority to Chinese Patent Application No. 2022111681260, filed Sep. 23, 2022, which is hereby incorporated by reference in its entirety.

FIELD

The present application relates to the field of wireless communication, and in particular to a method and a device for wireless communication, an electronic device and a storage medium.

BACKGROUND

At present, in the current Wi-Fi market, especially in the field of internet of things, differences in understanding and implementation of details of the 802.11 protocol cause some compatibility issues among various Wi-Fi products. In order to solve these issues, most solution providers for some specific application scenarios have launched a Wi-Fi package product, that is, using their own two Wi-Fi devices as access point (AP) device and a station (STA) device.

Since many Wi-Fi package products in the field of IoT belong to battery-type products, higher requirements are posed on power consumption of Wi-Fi package products. Low-power design of traditional Wi-Fi package products is mainly based on a concept of a delivery traffic indication message (DTIM) in the 802.11 protocol, and a beacon frame can be received based on a periodic wake up operation and then it is determined that whether there is cache information for an STA in the beacon frame from an AP. This solution has a limited reduction in power consumption, and how to further reduce the power consumption of Wi-Fi package products has become an urgent problem to be solved.

SUMMARY

This application provides a method and a device for wireless communication, an electronic device and a storage medium, which can solve the problem of how to further reduce the power consumption of Wi-Fi package products in the related art, can reduce a wakeup time of a station device in a sleep cycle by reducing a transmission time of a beacon frame to reduce the power consumption of Wi-Fi package products.

The present application provides a method for wireless communication, including:

determining, by an access point device, a first beacon frame and a first modulation mode; and transmitting, by the access point device, the first beacon frame to a station device according to the first modulation mode;

where the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode;

a length of the target beacon frame is shorter than a length of the original beacon frame, and a transmission rate corresponding to the target modulation mode is greater than a transmission rate corresponding to the original modulation mode.

According to the method for wireless communication provided by the present application, the target beacon frame is determined through the following steps:

selecting one or more unessential field data from a plurality of unessential field data of the original beacon frame; and removing one or more unessential field data from the original beacon frame to obtain the target beacon frame.

According to the method for wireless communication provided by the present application, the selecting one or more unessential field data from a plurality of unessential field data of the original beacon frame includes:

selecting one or more unessential field data having a length greater than a preset length from the plurality of unessential field data of the original beacon frame.

According to the method for wireless communication provided by the present application, the selecting one or more unessential field data from a plurality of unessential field data of the original beacon frame includes:

randomly selecting one or more unessential field data from the plurality of unessential field data of the original beacon frame.

According to the method for wireless communication provided by the present application, the plurality of unessential field data of the original beacon frame include: an access point (AP) channel report, high-throughput capabilities (HT CAP), high-throughput information (HT Info), a very high-throughput (VHT) capabilities element, a very high-throughput operation element, extended capabilities, a vendor specific 1, a vendor specific 2, and a vendor specific 3.

According to the method for wireless communication provided by the present application, the target modulation mode is associated with one or more of the following factors: demodulation capabilities of the station device in various modulation modes, sensitivities of the station device in various modulation modes, an anti-interference capability of the wireless station device and a beacon transmission rate.

According to the method for wireless communication provided by the present application, the target modulation mode is an 802.11g mcs0 modulation mode.

The present application further provides a device for wireless communication, including:

a determining module, configured to determine a first beacon frame and a first modulation mode; and a transmitting module, configured to transmit the first beacon frame to a station device according to the first modulation mode;

where the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode;

a length of the target beacon frame is shorter than a length of the original beacon frame, and a transmission rate corresponding to the target modulation mode is greater than a transmission rate corresponding to the original modulation mode.

The present application further provides an electronic device, including a processor, and a memory for storing a computer program executable by the processor, where the computer program, when executed by the processor, causes the processor to perform steps of any one of the above-mentioned method for wireless communication.

The present application further provides a non-transitory computer-readable storage medium having a computer program stored thereon, where the computer program, when executed by a processor, causes the processor to perform steps of any one of the above-mentioned method for wireless communication.

In the method and device for wireless communication, the electronic device, and the storage medium provided by the present application, first, the access point device determines the first beacon frame and the first modulation mode; then the access point device transmits the first beacon frame to the station device according to the first modulation mode. When the first beacon frame is the target beacon frame and the first modulation mode is the original modulation mode, since the length of the target beacon frame is shorter than the length of the original beacon frame, that is, the length of the beacon frame is reduced, the time for transmission of the beacon frame can be reduced. When the first beacon frame is the original beacon frame and the first modulation mode is the target modulation mode, since the transmission rate corresponding to the target modulation mode is greater than the transmission rate corresponding to the original modulation mode, that is, the transmission rate corresponding to the beacon frame is increased, the time for transmission of the beacon frame can be decreased. When the first beacon frame is the target beacon frame and the first modulation mode is the target modulation mode, since the length of the target beacon frame is shorter than the length of the original beacon frame, that is, the length of the beacon frame is reduced, the transmission rate corresponding to the target modulation mode is greater than the transmission rate corresponding to the original modulation mode, that is, the transmission rate corresponding to the beacon frame is increased, the time for transmission of the beacon frame can be decreased. The wakeup time of the station device in the sleep cycle is reduced by reducing the time for transmission of the beacon frame to reduce the power consumption of Wi-Fi package products.

BRIEF DESCRIPTION OF DRAWINGS

In order to more clearly illustrate the solutions in the present application or the prior art, the following will briefly introduce the accompanying drawings that need to be used in the description of the embodiments or the related art. The accompanying drawings in the following description are some embodiments of the present application, those of ordinary skill in the art can also obtain other drawings based on these drawings without creative efforts.

FIG. 1 is a flow chart of a method for wireless communication according to the present application;

FIG. 2 is a diagram showing a frame format of an original beacon frame according to the present application;

DETAILED DESCRIPTION OF THE EMBODIMENTS

Figure 3:
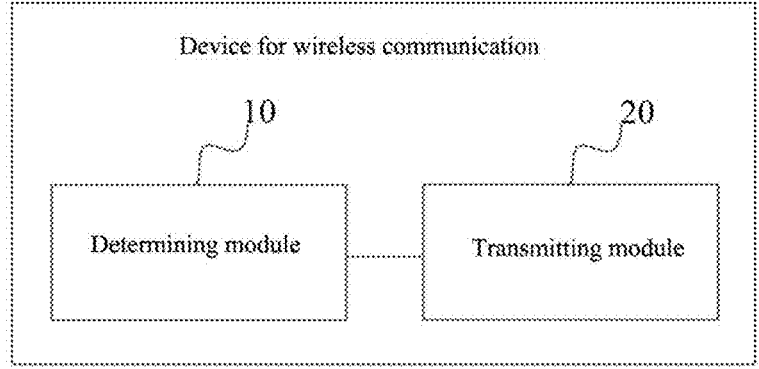
FIG. 3 is a structural diagram of a device for wireless communication according to the present application.

In order to illustrate the objects, solutions and advantages of the application, the solutions in present the application will be described clearly and completely below in combination with the drawings in the embodiments of the application. The described embodiments are part of the embodiments of the application, not all of them. Based on the embodiments of the application, all other embodiments obtained by those of ordinary skill in the art without creative work fall within the protection scope of the present application.

The following are main factors affecting the power consumption of Wi-Fi package products:

1) multiple of DTIM;
2) wakeup time;
3) a synchronous accuracy rate of timing synchronization function (Tsf) between a STA and a AP;
4) data interaction between the AP and the STA for each wakeup;
5) a substrate current and a receive (Rx) current of a device in sleep.

For a fixed multiple of DTIM, a fixed substrate current and a fixed Rx current, a main factor that affects the power consumption of Wi-Fi package products is the size of the wakeup time.

The wakeup time includes:

1) hardware recovery time (μs level);
2) software recovery time (μs level);
3) time for transmission of the beacon frame (ms level);
4) time to trigger sleep (μs level).

The total wakeup time is mainly determined based on the time for transmission of the beacon frame. The total wakeup time can be decreased by reducing the time for transmission of the beacon frame, which can decrease the power consumption of the Wi-Fi package products.

On this basis, an embodiment of the present application provides a method and a device for wireless communication, an electronic device and a storage medium, which can reduce the time for transmission of the beacon frame, and decrease the wakeup time of the station device in the sleep cycle by reducing the time for transmission of the beacon frame to reduce the power consumption of Wi-Fi package products.

The method for wireless communication according to the present application is described below with reference to FIG. 1 to FIG. 2.

Referring to FIG. 1. FIG. 1 is a flow chart of a method for wireless communication according to the present application. As shown in FIG. 1, the method may include the following steps:

step 101: determining, by an access point device, a first beacon frame and a first modulation mode, where the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode; a length of the target beacon frame is shorter than a length of the original beacon frame, and a transmission rate corresponding to the target modulation mode is greater than a transmission rate corresponding to the original modulation mode;

step 102: transmitting, by the access point device, the first beacon frame to a station device according to the first modulation mode.

In step 101, the Wi-Fi package products include a first Wi-Fi device and a second Wi-Fi device. The first Wi-Fi device is used as the access point device, and the second Wi-Fi device is used as the station device.

In an embodiment, step 101 may include the following three cases.

Case 1, the access point device determines that the first beacon frame is the target beacon frame, the first modulation mode is the original modulation mode, and the length of the target beacon frame is shorter than the length of the original beacon frame;

Case 2, the access point device determines that the first beacon frame is the original beacon frame, the first modulation mode is the target modulation mode, and the transmission rate corresponding to the target modulation mode is greater than the transmission rate corresponding to the original modulation mode;

Case 3, the access point device determines that the first beacon frame is the target beacon frame, the first modulation mode is the target modulation mode, the length of the target beacon frame is shorter than the length of the original beacon frame, and the transmission rate corresponding to the target modulation mode is greater than the transmission rate corresponding to the original modulation mode.

For case 1, in case that the first beacon frame is the target beacon frame and the first modulation mode is the original modulation mode, since the original beacon frame is replaced by the target beacon frame, and the length of the target beacon frame is shorter than the length of the original beacon frame, that is, the length of the beacon frame is reduced, and the modulation mode remains unchanged, which can reduce the time for transmission of the beacon frame.

For case 2, in case that the first beacon frame is the original beacon frame and the first modulation mode is the target modulation mode, since the original modulation mode is replaced by the target modulation mode, and the transmission rate corresponding to the target modulation mode is greater than the transmission rate of the original modulation mode, that is, the transmission rate corresponding to the beacon frame is increased, and the beacon frame remains unchanged, which can reduce the time for transmission of the beacon frame.

For case 3, in case that the first beacon frame is the target beacon frame and the first modulation mode is the target modulation mode, since the original beacon frame is replaced by the target beacon frame, the length of the target beacon frame is shorter than the length of the original beacon frame, that is, the length of the beacon frame is reduced, the original modulation mode is replaced by the target modulation mode, and the transmission rate corresponding to the target modulation mode is greater than the transmission rate corresponding to the original modulation mode, that is, the transmission rate of the beacon frame is increased, which can reduce the time for transmission of the beacon frame.

In this embodiment, first, the access point device determines the first beacon frame and the first modulation mode; then the access point device transmits the first beacon frame to the station device according to the first modulation mode. When the first beacon frame is the target beacon frame and the first modulation mode is the original modulation mode, since the length of the target beacon frame is shorter than the length of the original beacon frame, that is, the length of the beacon frame is decreased, the time for transmission of the beacon frame can be reduced. When the first beacon frame is the original beacon frame and the first modulation mode is the target modulation mode, since the transmission rate corresponding to the target modulation mode is greater than the transmission rate corresponding to the original modulation mode, that is, the transmission rate corresponding to the beacon frame is increased, the time for transmission of the beacon frame can be reduced. When the first beacon frame is the target beacon frame and the first modulation mode is the target modulation mode, since the length of the target beacon frame is shorter than the length of the original beacon frame, that is, the length of the beacon frame is decreased, the transmission rate corresponding to the target modulation mode is greater than the transmission rate corresponding to the original modulation mode, that is, the transmission rate corresponding to the beacon frame is increased, the time for transmission of the beacon frame can be reduced. The wakeup time of the station device in the sleep cycle is reduced by reducing the time for transmission of the beacon frame, to reduce the power consumption of Wi-Fi package products.

In an embodiment, the target beacon frame is determined through the following steps:

step 201: selecting one or more unessential field data from a plurality of unessential field data of the original beacon frame;

step 202: removing one or more unessential field data from the original beacon frame to obtain the target beacon frame.

In step 201, the frame format of the original beacon frame is as shown in FIG. 2. The original beacon frame includes: a frame header, a frame body and a frame end. The frame header is a media access control address (Mac) header, and the frame end is a frame check sequence (FCS). The frame header and frame end are essential parts of the entire beacon frame, and a removable part of the beacon frame mainly starts from the frame body.

Member names, member identifiers and lengths of each field of the original beacon frame are shown in table 1.

TABLE 1

| member names, member identifiers and lengths of each field of the original beacon frame | | | |
|---|---|---|---|
| | Member name | Member identifier | Length |
| Original beacon frame | Mac header | Default | 24 |
| | Beacon timestamp | Default | 8 |
| | Beacon interval | Default | 2 |
| | Capability info | Default | 2 |
| | SSID | 0 | 8 |
| | Rates | 1 | 8 |
| | DSPS | 3 | 1 |
| | TIM | 5 | 6 |
| | Country | 7 | 6 |
| | AP channel report | 51 | 13 |
| | ERP | 42 | 1 |
| | Extended supported rates | 50 | 4 |
| | WPA | 221 | 22 |
| | RSN | 48 | 20 |
| | HT CAP | 45 | 26 |
| | HT info | 61 | 22 |
| | VHT capabilities element | 191 | 12 |
| | VHT operation element | 192 | 5 |
| | Extended capabilities | 127 | 8 |
| | WMM | 221 | 24 |
| | Vendor specific 1 | 223 | 70 |
| | Vendor specific 2 | 223 | 33 |
| | Vendor specific 3 | 223 | 73 |
| | FCS | default | 4 |
| | Sum | | 402 |

The plurality of unessential field data in the frame body of the original beacon frame includes: access point channel report (AP channel report), high-throughput capability (HT CAP), high-throughput information (HT Info), very high-throughput capabilities element (VHT capabilities element), very high-throughput operation element (VHT operation element), extended capabilities, vendor specific 1, vendor specific 2, and vendor specific 3.

The following are interpretations of each member name of the above original beacon frame:

1) Mac header represents the Mac header, that is, the frame header;
2) Beacon timestamp represents a timestamp of the beacon frame;
3) Beacon interval represents an interval of the beacon frame;
4) Capability info represents capability information;
5) SSID represents service set identifier;
6) Rates represents supported rates;
7) DSPS represents a direct sequence parameter set;
8) TIM represents traffic indication map;
9) Country represents a country code;
10) AP Channel Report represents an access point channel report;
11) ERP represents extended rate physical layer;
12) ESR represents extended support rates;
13) WPA represents Wi-Fi protected access;
14) RSN represents robust security network;
15) HT CAP represents high-throughput capability;
16) HT info represents high-throughput information;
17) VHT capabilities element represents very high-throughput capabilities element;
18) VHT operation element represents very high-throughput operation element;
19) Extended capabilities represent extended capabilities;
20) WMM represents Wi-Fi multimedia;
21) Vendor specific represents vendor specific;
22) FCS represents frame check sequence, which is also called frame end.

In this step, one or more unessential field data is selected from the plurality of unessential field data in the frame body of the original beacon frame, for example: any one or more or all of the above-mentioned 9 unessential field data can be selected.

In an embodiment, step 201 includes: selecting one or more unessential field data having a length greater than a preset length from the plurality of unessential field data of the original beacon frame.

For example, assuming that the preset length is 25, unessential field data with the length greater than the preset length includes: HT CAP, vendor specific 1, vendor specific 2, and vendor specific 3. One or more or all of the unessential fields can be selected from these unessential field data.

In this embodiment, unessential field data with the length greater than a preset length may be preferably selected as the data to be curtailed.

In an embodiment, step 202 includes: randomly selecting one or more unessential field data selected from the plurality of unessential field data of the original beacon frame.

In this embodiment, unessential field data of the original beacon frame may be randomly selected as the data to be curtailed.

In step 202, after selecting one or more unessential field data of the original beacon frame, one or more unessential field data is removed from the original beacon frame to obtain a target beacon frame.

Assuming that all unessential field data with a length greater than 25 are removed, that is, the length of the original beacon frame is shortened from 402 bytes to 200 bytes, and the target beacon frame is obtained.

Assuming that all unessential field data are removed, the length of the original beacon frame is shortened from 402 bytes to 140 bytes. The member names, member identifiers and lengths of each field of the shortened beacon frame (that is, the target beacon frame) are shown in Table 2.

TABLE 2 member names, member identifiers and lengths of each field of the target beacon frame

| | Member name | Member identifier | Length |
|---|---|---|---|
| Target beacon frame | Mac header | Default | 24 |
| | Beacon timestamp | Default | 8 |
| | Beacon interval | Default | 2 |
| | Capability info | Default | 2 |
| | SSID | 0 | 8 |
| | Rates | 1 | 8 |
| | DSPS | 3 | 1 |
| | TIM | 5 | 6 |
| | Country | 7 | 6 |
| | ERP | 42 | 1 |
| | Extended supported rates | 50 | 4 |
| | WPA | 221 | 22 |
| | RSN | 48 | 20 |
| | WMM | 221 | 24 |
| | FCS | Default | 4 |
| Sum | | | 140 |

Assuming that the first modulation mode is the original modulation mode, and the corresponding transmission rate is 1 Mbps, the time for transmission of the original beacon frame (with the length of 402 bytes) over the air interface is 3.216 ms, and the time for transmission of the shortened target beacon frame (with the length of 140 bytes) over the air interface is 1.12 ms. That is, with the length of the beacon frame being decreased, the time for transmission of the beacon frame can be reduced.

In this embodiment, one or more unessential field data is removed from the original beacon frame to obtain the target beacon frame, which can decrease the length of the beacon frame, thereby reducing the time for transmission of the beacon frame.

In an embodiment, the target modulation mode is associated with one or more of the following factors: demodulation capabilities of the station device in various modulation modes, sensitivities of the station device in various modulation modes, an anti-interference capability of the station device and a beacon transmission rate.

In an embodiment, the target modulation mode is selected from modulation modes such as 802.11a/b/g/n/ac/ax based on one or more of the aforementioned factors. The modulation modes of 802.11b/a/g/n are briefly listed below through table 3 and table 4.

TABLE 3 modulation modes of 802.11b/a/g

| Protocol standard | Mcs | Modulation mode | Transmission rate (Mbps) |
|---|---|---|---|
| 802.11b | Mcs0 | DSSS | 1 |
| | Mcs1 | DSSS | 2 |
| | Mcs2 | CCK | 5.5 |

TABLE 3-continued

| modulation modes of 802.11b/a/g | | | |
| --- | --- | --- | --- |
| Protocol standard | Mcs | Modulation mode | Transmission rate (Mbps) |
| | Mcs3 | CCK | 11 |
| 802.11a/g | Mcs0 | BPSK | 6 |
| | Mcs1 | BPSK | 9 |
| | Mcs2 | QPSK | 12 |
| | Mcs3 | QPSK | 18 |
| | Mcs4 | 16-QAM | 24 |
| | Mcs5 | 16-QAM | 36 |
| | Mcs6 | 64-QAM | 48 |
| | Mcs7 | 64-QAM | 54 |

TABLE 4

| modulation modes of 802.11n | | | | | | |
| --- | --- | --- | --- | --- | --- | --- |
| | | Modula- | HT20 data rate (Mbps) | | HT40 data rate (Mbps) | |
| Protocol standard | Mcs | tion mode | GI = 800 ns | GI = 400 ns | GI = 800 ns | GI = 400 ns |
| 802.11n | Mcs0 | BPSK | 6.5 | 7.2 | 13.5 | 15.0 |
| | Mcs1 | QPSK | 13.0 | 14.2 | 27.0 | 30.0 |
| | Mcs2 | QPSK | 19.5 | 21.7 | 40.5 | 45.0 |
| | Mcs3 | 16-QAM | 26.0 | 28.9 | 54.0 | 60.0 |
| | Mcs4 | 16-QAM | 39.0 | 43.3 | 81.0 | 90.0 |
| | Mcs5 | 64-QAM | 52.0 | 57.8 | 108.0 | 120.0 |
| | Mcs6 | 64-QAM | 58.5 | 65.0 | 121.5 | 135.0 |
| | Mcs7 | 64-QAM | 65.0 | 72.2 | 135.0 | 150.0 |
| | Mcs8 | BPSK | 13.0 | 14.4 | 27.0 | 30.0 |
| | Mcs9 | QPSK | 26.0 | 28.9 | 54.0 | 60.0 |
| | Mcs10 | QPSK | 39.0 | 43.3 | 81.0 | 90.0 |
| | Mcs11 | 16-QAM | 52.0 | 57.8 | 108.0 | 120.0 |
| | Mcs12 | 16-QAM | 78.0 | 86.7 | 162.0 | 180.0 |
| | Mcs13 | 64-QAM | 104.0 | 115.6 | 216.0 | 240.0 |
| | Mcs14 | 64-QAM | 117.0 | 130.0 | 243.0 | 270.0 |
| | Mcs15 | 64-QAM | 130.0 | 144.4 | 270.0 | 300.0 |

Interpretations of the abbreviations in table 3 and table 4 above are as follows:

1) DSSS represents direct sequence spread spectrum;
2) CCK represents complementary code keying;
3) BPSK represents binary phase shift keying;
4) QPSK represents quadrature phase shift keying;
5) QAM represents quadrature amplitude modulation;
6) HT represents high-throughput;
7) GI represents guard interval.

In order to be compatible with old protocol standards, most of the current access point devices transmits the beacon frame using the 802.11b mcs0 mode (that is, the original modulation mode), and it can be seen from table 3 that the transmission rate of 802.11b mcs0 is 1 Mbps.

The target modulation mode may be a modulation mode having similar demodulation capabilities, sensitivities, and anti-interference capability to the original modulation mode and having the highest beacon transmission rate. This embodiment is not limited thereto.

In an embodiment, the following factors should be comprehensively considered: demodulation capabilities of the station device under various modulation modes, sensitivities of the station device under various modulation modes, anti-interference capability of the station device and a beacon transmission rate. The 802.11g mcs0 modulation mode is selected as the target modulation mode. The transmission rate of the 802.11g mcs0 modulation mode is 6 Mbps, that is, the transmission rate corresponding to the target modulation mode is greater than the transmission rate corresponding to the original modulation mode.

If the first modulation mode is the original modulation mode (802.11a mcs0 modulation mode corresponding to the transmission rate of 1 Mbps), the transmission time of the target beacon frame (140 bytes in length) over an air interface is 1.12 ms.

If the first modulation mode is replaced by the target modulation mode (802.11g mcs0 modulation mode corresponding to transmission rate of 6 Mbps), the time for transmission of the target beacon frame (140 bytes in length) over the air interface is 0.187 ms, that is, 187μ. The transmission rate of the beacon frame is increased, which can reduce the time for transmission of the beacon frame.

If the first modulation mode is the original modulation mode (802.11a mcs0 modulation mode, whose transmission rate is 1 Mbps), the time for transmission of the original beacon frame (402 bytes in length) over the air interface is 3.216 ms. If the first modulation mode is replaced by the target modulation mode (802.11g mcs0 modulation mode corresponding to transmission rate of 6 Mbps), the time for transmission of the target beacon frame (140 bytes in length) over the air interface is 0.187 ms, that is, 187 μs. In this embodiment, the time for transmission of the beacon frame over the air interface is greatly reduced, which also greatly reduces the wakeup time of the wireless station device in the sleep cycle, and the power consumption of Wi-Fi package products is greatly reduced. Table 5 shows measured comparison data of the power consumption of the Wi-Fi package product in this embodiment and the related art.

TABLE 5

| measured comparison data of the power consumption of Wi-Fi package products in the present embodiment and the related art | | |
| --- | --- | --- |
| Multiple of DTIM | Related art | Present embodiment |
| 1 | 1251 μa | 981 μa |
| 3 | 462 μa | 354 μa |
| 10 | 221 μa | 179 μa |

The measured comparative data in table 3 show that the power consumption of Wi-Fi package products can be reduced in the present embodiment.

The device for wireless communication provided by this application is described below, and the device for wireless communication described below and the method for wireless communication described above may be referred to in correspondence.

Referring FIG. 3, FIG. 3 is a structural diagram of a device for wireless communication according to the present application. As shown in FIG. 3, the device includes:

a determining module 10, configured to determine a first beacon frame and a first modulation mode; and a transmitting module 20, configured to transmit the first beacon frame to a station device according to the first modulation mode;

where the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode;

a length of the target beacon frame is shorter than a length of the original beacon frame, and a transmission rate corresponding to the target modulation mode is greater than a transmission rate corresponding to the original modulation mode.

In an embodiment, the determining module 10 determines the target beacon frame by:

selecting one or more unessential field data from a plurality of unessential field data of the original beacon frame; and removing one or more unessential field data from the original beacon frame to obtain the target beacon frame.

In an embodiment, the determining module 10 selects one or more unessential field data by:

selecting one or more unessential field data having a length greater than a preset length from the plurality of unessential field data of the original beacon frame.

In an embodiment, the determining module 10 selects one or more unessential field data by:

randomly selecting one or more unessential field data from the plurality of unessential field data of the original beacon frame.

In an embodiment, the plurality of unessential field data of the original beacon frame include: an access point (AP) channel report, high-throughput capabilities (HT CAP), high-throughput information (HT Info), a very high-throughput (VHT) capabilities element, a very high-throughput operation element, extended capabilities, a vendor specific 1, a vendor specific 2, and a vendor specific 3.

In an embodiment, the target modulation mode is associated with one or more of the following factors: demodulation capabilities of the station device in various modulation modes, sensitivities of the station device in various modulation modes, an anti-interference capability of the station device and a beacon transmission rate.

In an embodiment, the target modulation mode is an 802.11g mcs0 modulation mode.

Figure 4:
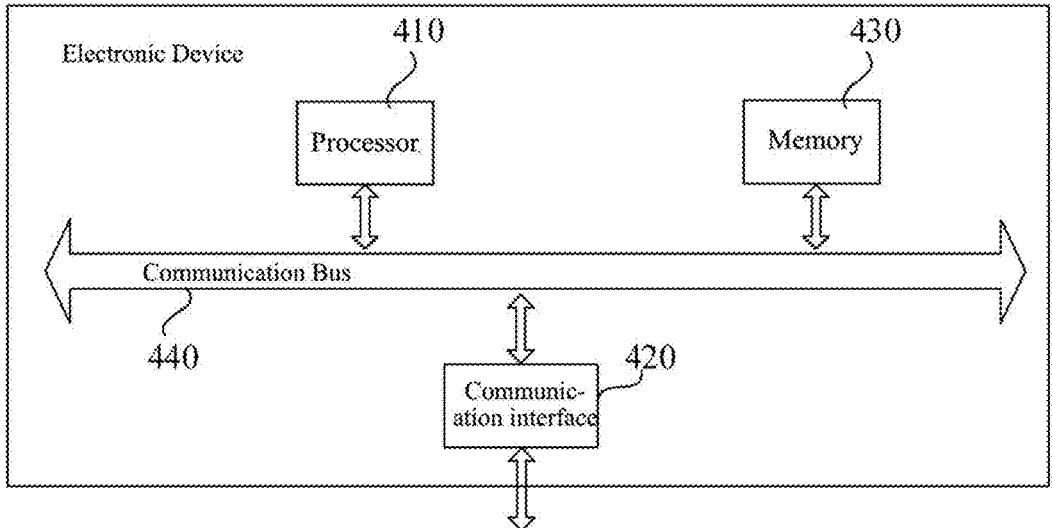
FIG. 4 is a structural diagram of an electronic device according to the present application.

FIG. 4 illustrates a diagram of an entity structure of an electronic device. As shown in FIG. 4, the electronic device may include: a processor 410, a communication interface 420, a memory 430 and a communication bus 440. The processor 410, the communication interface 420, and the memory 430 communicate with each other through the communication bus 440. The processor 410 may invoke logic instructions in the memory 430 to perform a method for wireless communication, including:

determining, by an access point device, a first beacon frame and a first modulation mode; and transmitting, by the access point device, the first beacon frame to a station device according to the first modulation mode;

where the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode;

a length of the target beacon frame is shorter than a length of the original beacon frame, and a transmission rate corresponding to the target modulation mode is greater than a transmission rate corresponding to the original modulation mode.

In addition, the above logic instructions in the memory 430 can be realized in the form of software function units and be stored in a computer-readable storage medium when sold or used as an individual product. The solutions of the present application in essential or the part of the solutions that contributes to the related art or the part of the solutions can be embodied in the form of a software product, and the computer software product is stored in a storage medium, including several instructions, which are used to make a computer device (which can be a personal computer, a server, or a network device and the like) execute all or part of the steps of the methods described in the various embodiments of the present application. The aforementioned storage media include: USB flash disk, mobile hard disk, read-only memory (ROM), random access memory (RAM), magnetic disk or optical disk, and other media that can store program codes.

In an embodiment, the electronic device shown in FIG. 4 may be a chip or a chip system.

The present application further provides a computer program product, the computer program product includes a computer program stored on a non-transitory computer-readable storage medium, the computer program includes program instructions, and the program instructions, when executed by the processor, causes the processor to perform steps of the above-mentioned method for wireless communications. The method includes:

determining, by an access point device, a first beacon frame and a first modulation mode; and transmitting, by the access point device, the first beacon frame to a station device according to the first modulation mode;

where the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode;

a length of the target beacon frame is shorter than a length of the original beacon frame, and a transmission rate corresponding to the target modulation mode is greater than a transmission rate corresponding to the original modulation mode.

The present application further provides a non-transitory computer-readable storage medium having a computer program stored thereon, the computer program includes program instructions, and the computer program, when executed by a processor, causes the processor to perform steps of the above-mentioned method for wireless communications. The method includes:

determining, by an access point device, a first beacon frame and a first modulation mode; and transmitting, by the access point device, the first beacon frame to a station device according to the first modulation mode;

where the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode;

a length of the target beacon frame is shorter than a length of the original beacon frame, and a transmission rate corresponding to the target modulation mode is greater than a transmission rate corresponding to the original modulation mode.

The device embodiments described above are merely illustrative, the units described as separate components may or may not be physically separate, and the components displayed as units may or may not be physical units, that is, may be located at the same place or be distributed to multiple network units. Some or all of the modules may be selected according to actual needs to achieve the purpose of the solution of the present embodiment. Those of ordinary skill in the art can understand and implement the solution described above without paying creative works.

Through the description of the embodiments above, those skilled in the art can clearly understand that the various embodiments can be implemented by means of software and a necessary general hardware platform, or by hardware. Based on such understanding, the above solutions of the present application in essence or a part of the solutions that contributes to the related art can be embodied in the form of a software product, which can be stored in a storage medium such as ROM/RAM, magnetic disk, compact disk and the like, and includes several instructions to cause a computer device (which can be a personal computer, server, network device and the like) to perform the methods described in various embodiments or a part thereof.

Finally, it should be noted that the above embodiments are only used to explain the solutions of the present application, and are not to limited them. Although the present application has been described in detail with reference to the foregoing embodiments, it should be understood by those skilled in the art that they can still modify the solutions documented in the foregoing embodiments and make equivalent substitutions to a part of the features; these modifications and substitutions do not make the essence of the corresponding solutions depart from the scope of the solutions of various embodiments of the present application.

What is claimed is:

1. A method for wireless communication, comprising:
   determining, by an access point device, a first beacon frame and a first modulation mode; and
   transmitting, by the access point device, the first beacon frame to a station device according to the first modulation mode;
   wherein the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode;
   a length of the target beacon frame is shorter than a length of the original beacon frame, and a transmission rate corresponding to the target modulation mode is greater than a transmission rate corresponding to the original modulation mode;
   wherein the target beacon frame is determined through the following steps:
   selecting one or more unessential field data from a plurality of unessential field data of the original beacon frame; and
   removing one or more unessential field data from the original beacon frame to obtain the target beacon frame.

2. The method of claim 1, wherein the selecting one or more unessential field data from a plurality of unessential field data of the original beacon frame comprises:
   selecting one or more unessential field data having a length greater than a preset length from the plurality of unessential field data of the original beacon frame.

3. The method of claim 2, wherein the plurality of unessential field data of the original beacon frame comprise: an access point channel report, high-throughput capabilities, high-throughput information, a very high-throughput capabilities element, a very high-throughput operation element, extended capabilities, a vendor specific 1, a vendor specific 2, and a vendor specific 3.

4. The method of claim 2, wherein the target modulation mode is associated with one or more of the following factors: demodulation capabilities of the station device in various modulation modes, sensitivities of the station device in various modulation modes, an anti-interference capability of the station device and a beacon transmission rate.

5. The method of claim 1, wherein the selecting one or more unessential field data from a plurality of unessential field data of the original beacon frame comprises:
   randomly selecting one or more unessential field data from the plurality of unessential field data of the original beacon frame.

6. The method of claim 5, wherein the plurality of unessential field data of the original beacon frame comprise: an access point channel report, high-throughput capabilities, high-throughput information, a very high-throughput capabilities element, a very high-throughput operation element, extended capabilities, a vendor specific 1, a vendor specific 2, and a vendor specific 3.

7. The method of claim 5, wherein the target modulation mode is associated with one or more of the following factors: demodulation capabilities of the station device in various modulation modes, sensitivities of the station device in various modulation modes, an anti-interference capability of the station device and a beacon transmission rate.

8. The method of claim 1, wherein the plurality of unessential field data of the original beacon frame comprise: an access point channel report, high-throughput capabilities, high-throughput information, a very high-throughput capabilities element, a very high-throughput operation element, extended capabilities, a vendor specific 1, a vendor specific 2, and a vendor specific 3.

9. The method of claim 8, wherein the target modulation mode is associated with one or more of the following factors: demodulation capabilities of the station device in various modulation modes, sensitivities of the station device in various modulation modes, an anti-interference capability of the station device and a beacon transmission rate.

10. The method of claim 1, wherein the target modulation mode is associated with one or more of the following factors: demodulation capabilities of the station device in various modulation modes, sensitivities of the station device in various modulation modes, an anti-interference capability of the station device and a beacon transmission rate.

11. The method of claim 10, wherein the target modulation mode is an 802.11g mcs0 modulation mode.

12. The method of claim 1, wherein the target modulation mode is associated with one or more of the following factors: demodulation capabilities of the station device in various modulation modes, sensitivities of the station device in various modulation modes, an anti-interference capability of the station device and a beacon transmission rate.

13. An electronic device, comprising a processor and a memory for storing a computer program executable by the processor, wherein the computer program, when executed by the processor, causes the processor to perform the following steps:
   determining, by an access point device, a first beacon frame and a first modulation mode; and
   transmitting, by the access point device, the first beacon frame to a station device according to the first modulation mode;

wherein the first beacon frame is a target beacon frame, and the first modulation mode is an original modulation mode; or, the first beacon frame is an original beacon frame, and the first modulation mode is a target modulation mode; or, the first beacon frame is the target beacon frame, and the first modulation mode is the target modulation mode;

a length of the target beacon frame is shorter than a length of the original beacon frame, and a transmission rate corresponding to the target modulation mode is greater than a transmission rate corresponding to the original modulation mode;

wherein the target beacon frame is determined through the following steps:

selecting one or more unessential field data from a plurality of unessential field data of the original beacon frame; and removing one or more unessential field data from the original beacon frame to obtain the target beacon frame.

14. The electronic device of claim 13, wherein the selecting one or more unessential field data from a plurality of unessential field data of the original beacon frame comprises:

selecting one or more unessential field data having a length greater than a preset length from the plurality of unessential field data of the original beacon frame.

15. The electronic device of claim 4, wherein the plurality of unessential field data of the original beacon frame comprise: an access point channel report, high-throughput capabilities, high-throughput information, a very high-throughput capabilities element, a very high-throughput operation element, extended capabilities, a vendor specific 1, a vendor specific 2, and a vendor specific 3.

16. The electronic device of claim 13, wherein the selecting one or more unessential field data from a plurality of unessential field data of the original beacon frame comprises:

randomly selecting one or more unessential field data from the plurality of unessential field data of the original beacon frame.

17. The electronic device of claim 13, wherein the plurality of unessential field data of the original beacon frame comprise: an access point channel report, high-throughput capabilities, high-throughput information, a very high-throughput capabilities element, a very high-throughput operation element, extended capabilities, a vendor specific 1, a vendor specific 2, and a vendor specific 3.

18. A non-transitory computer-readable storage medium for storing a computer program that, when executed by a processor, causes the processor to perform the steps of the method of claim 1.

* * * * *